(12) United States Patent
Nandyala et al.

(10) Patent No.: US 10,353,920 B2
(45) Date of Patent: Jul. 16, 2019

(54) EFFICIENT MIRROR DATA RE-SYNC

(71) Applicant: Oracle International Corporation, Redwood Shores, CA (US)

(72) Inventors: Harish Nandyala, Fremont, CA (US); Samarjeet S. Tomar, Bangalore (IN); Prasad V. Bagal, Saratoga, CA (US); Somya Gupta, New Delhi (IN); Mounica Prodduturu, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 215 days.

(21) Appl. No.: 15/331,688

(22) Filed: Oct. 21, 2016

(65) Prior Publication Data

US 2017/0116300 A1 Apr. 27, 2017

Related U.S. Application Data

(60) Provisional application No. 62/245,444, filed on Oct. 23, 2015.

(51) Int. Cl.
*G06F 17/30* (2006.01)
*G06F 16/27* (2019.01)
*G06F 11/14* (2006.01)

(52) U.S. Cl.
CPC ........ *G06F 16/273* (2019.01); *G06F 11/1446* (2013.01)

(58) Field of Classification Search
CPC ...................................................... G06F 17/30
See application file for complete search history.

(56) References Cited

U.S. PATENT DOCUMENTS

| | | | | |
|---|---|---|---|---|
| 5,970,502 | A * | 10/1999 | Salkewicz | G06F 17/30581 707/999.104 |
| 6,321,236 | B1 * | 11/2001 | Zollinger | G06F 17/30581 707/999.001 |
| 6,643,669 | B1 * | 11/2003 | Novak | G06F 17/30581 707/999.201 |
| 7,143,194 | B1 * | 11/2006 | Curley | G06F 17/30581 709/248 |

OTHER PUBLICATIONS

Schutt, T et al., "Efficient Synchronization of Replicated Data in Distributed Systems", In Prooceedings of the International Conference on Computational Science. Springer, dated 2003, 10 pages.

(Continued)

*Primary Examiner* — Khanh B Pham
(74) *Attorney, Agent, or Firm* — Hickman Palermo Becker Bingham LLP (57) ABSTRACT

Techniques are described herein for re-syncing a snapshot database with a base database. Data units of each database are associated with version numbers. When a data unit is modified, the data unit is associated with the current version number. When a snapshot database is re-synced with a base database, particular data units are copied from the base database to the snapshot database, based on the version number associated with the particular data units.

16 Claims, 8 Drawing Sheets

(56) References Cited

OTHER PUBLICATIONS

SANsymphony-V: https://www.datacore.com/SSVWebhelp/Mirroring_and_Mirror_Recovery.htm, "Mirroring and Mirror Recovery", last viewed on Oct. 5, 2016, 7 pages.
Sanjay Mishra, "Database Mirroring Best Practices and Performance Considerations", Microsoft Corp., Mar. 10, 2006, SQL Server Technical Article, 26 Pages.
Rsync: https://download.samba.org/pub/rsync/rsync.html, Rsync, "SYNOPSIS", dated Dec. 21, 2015, 52 pages. Roth, J. (2002). Patterns of Mobile Interaction Personal and Ubiquitous Computing 6(4) 282-289.
PervaSync: http://www.pervasync.com/about-pervasync, "Reliable Data Synchronization", dated 2008, 2 pages. NetApp SnapMirror: http://www.netapp.com/in/products/protection-software/snapmirror.aspx, "NetApp Snap Mirror Data Replication", dated 2016.
Junghoo Cho and Hector Garcia-Molina. 2000. Synchronizing a database to improve freshness. In Proceedings of the 2000 ACM SIGMOD, (SIGMOD '00). ACM, New York, NY, USA, 30 pages.
Choi, M.Y., Cho, E., Park, D.H., Moon, C.J. and Baik, D.K., 2010. A database synchronization algorithm for mobile devices. Consumer Electronics, IEEE Transactions on, 56(2), pp. 392-398.
AsperaSync: http://asperasoft.com/software/synchronization/#overview-558, Company Profile, 2 pages, last viewed on Oct. 5, 2016.

\* cited by examiner

EFFICIENT MIRROR DATA RE-SYNC

CROSS-REFERENCE TO RELATED APPLICATIONS; BENEFIT CLAIM

This application claims the benefit of Provisional Appln. 62/245,444, filed Oct. 23, 2015, the entire contents of which is hereby incorporated by reference as if fully set forth herein, under 35 U.S.C. § 119(e).

FIELD OF THE INVENTION

The present invention relates to database management. Specifically, the present invention relates to efficient data re-sync for mirrored databases.

BACKGROUND

For many database systems, it is desirable to have one or more physical copies of an original database. The database copies can be used to deploy and test applications or features prior to using them in production.

The database copy, referred to herein as a "snapshot database," is a point-in-time copy of a base database. The snapshot database mirrors data contained in the base database up until the time the point-in-time copy is created. Once the snapshot database is created, changes to the snapshot database and the base database are made independently. However, in order to ensure testing continues to be accurate and relevant, the snapshot database periodically needs to be re-synced with the base database in order to ensure the snapshot database contains up-to-date data. When re-syncing the snapshot database with the base database, changes made to the snapshot database are reverted, while changes made to the base database are copied to or reproduced in the snapshot database.

One method for re-syncing the base database with the snapshot database is to create a new point-in-time copy of the base database, and replace the old snapshot database. However, for large databases, the process of generating a new physical copy of a base database may be time-consuming. Additionally, if the previous copy of the snapshot database is not (or cannot be) deleted prior to creating the new copy, twice as much storage space is required in order to store both copies.

A second method is to compare each data block in the snapshot database with the base database. If the blocks are different, then the data in either the snapshot or the base database has changed. The data block is copied from the base database to the snapshot database. However, for large databases, this results in a large number of data block comparisons. Not only are the data comparisons computationally expensive for large amounts of data, it is inefficient to compare all the data blocks if only a small portion of each database has changed. Additionally, if multiple snapshot databases have to be re-synced, then data block comparisons are performed for each copy, which significantly increases the time and resources required.

A third method is to track all changes to each database. For example, the database system could maintain one or more change logs with timestamps corresponding to changes made to each database. However, tracking changes adds additional processing costs to writing data. Additionally, if the database system is a clustered database system, it is difficult to maintain consistent time stamps across nodes in the cluster.

Based on the foregoing, there is a need for a method to provide an efficient and high performance re-sync of a snapshot database with a base database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are presented herein for efficiently re-syncing one or more snapshot databases with a base database. Changes made to a snapshot database and to a base database are tracked. Only portions of the snapshot database that were modified, or portions that correspond to changes made to the base database, need to be synced with the base database.

A base database comprises a plurality of data units. A "data unit" may be a data block, a set of data blocks, an allocation unit comprising data blocks from a disk or disk group, an extent (set of contiguous data blocks in a file), or any other unit of storage for database data.

A snapshot database is a copy of the base database. Each data unit of the snapshot database is a copy of a corresponding data unit of the base database. The snapshot database is re-synced with the base database by copying one or more data units from the base database to the snapshot database.

According to an embodiment, each data unit of a database is associated with a first version number. When a data unit is updated, the data unit is associated with a second version number. The database system does not have to update the associated version number if the data unit is modified many times before the snapshot database is re-synced with the base database. Thus, the database system does not have to track every change made to the base database or the snapshot database. The database system only needs to track whether data at a location was modified.

When the snapshot database is re-synced, if a data unit in the base database is associated with the second version number, then the data unit is copied to the snapshot database. If a data unit in the snapshot database is associated with the second version number, then a corresponding data unit is copied from the base database. Thus, only data units that were modified have to be copied. In addition, the database system only has to check the version number associated with each data unit, rather than comparing the data stored in each data unit, to determine whether the data unit should be copied to the snapshot database.

System Overview

A snapshot database is a point-in-time copy of a base database. In order to generate a snapshot database, a database system copies all data stored in the base database at the time the copy is generated. While the database system prepares the snapshot database, changes to the base database are made to the copied data. After the database system finishes creating the snapshot database, changes made to the snapshot database and the base database are made independent of the other database.

Figure 1:
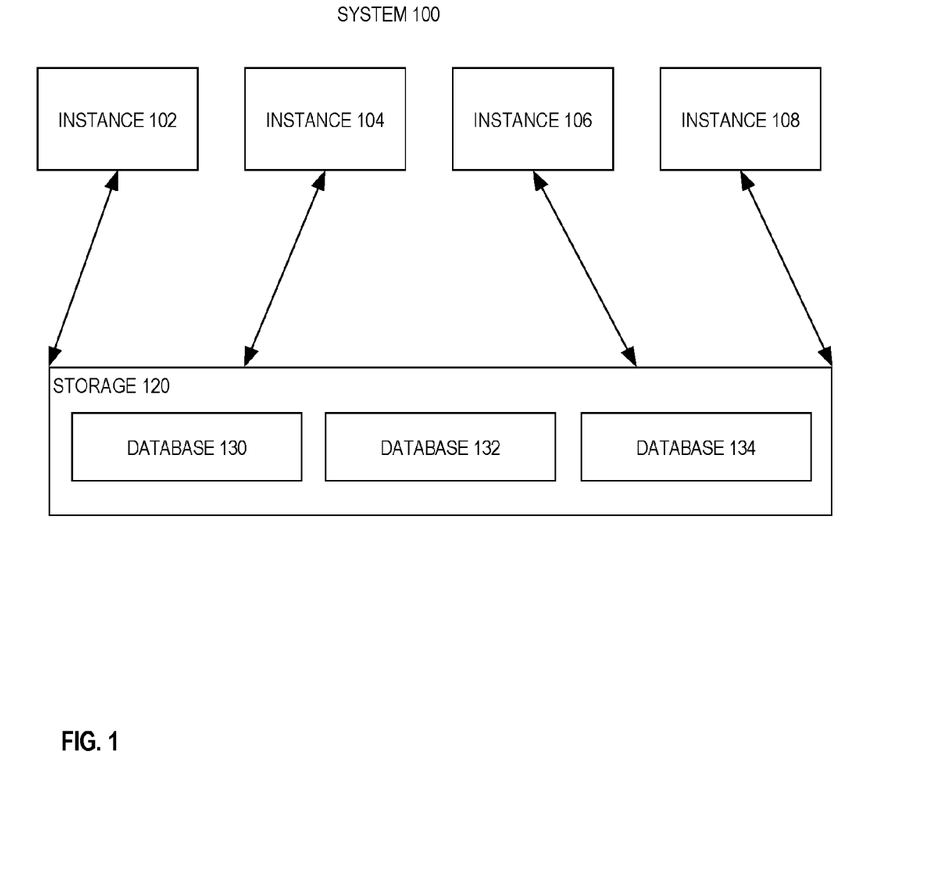
FIG. 1 is a block diagram illustrating database system storing snapshot databases, in an embodiment.

FIG. 1 is a block diagram that illustrates an example database system with a base database and two snapshot databases. Database management system (DBMS) 100 includes four instances: instance 102, instance 104, instance 106, and instance 108. Instances 102, 104, 106, and 108 may be database instances running on a database server, or may each be running on a respective node in a clustered database system.

Each of instances 102, 104, 106, and 108 have access to storage 120. Storage 120 may comprise one or more disks to which each of instances 102, 104, 106, and 108 have access. Storage 120 is storing a base database 130, snapshot database 132, and snapshot database 134. A snapshot database may be a copy of a base database or another snapshot database. For example, snapshot database 132 may be a copy of base database 130 at a first point in time, while snapshot database 134 may be a copy of snapshot database 132 at a second point in time.

In an embodiment, storage 120 comprises one or more disk groups managed by the DBMS. Each disk group may store data for databases 130, 132, and 134 as one or more respective database files. Each database file may comprise one or more data units. As referred to herein, a "data unit" is a unit of allocation for a disk group managed by the DBMS. Each disk group may be divided into a plurality of data units of a pre-determined size. For example, each data unit may store 1 MB of data. Instances 102, 104, 106, and 108 may be database file system instances that allow a database instance to access data stored in storage 120. In an embodiment, base database 130 comprises one or more database files. Creating a copy of database 130 includes copying the one or more database files.

For the purpose of illustrating a clear example, techniques are described with reference to data units, but may be used with data blocks, files, or other level of granularity and data storage structure.

Version Numbers

In order to re-sync data between snapshot databases and a base database, changes made to each database are tracked using version numbers. A version number indicates a point in time at which a copy of the base database was taken. The version number is the same across both the base database and all snapshot databases. For example, before any snapshot databases are created, the version number is set to 0. When the first snapshot database is created, the version number is increased to 1. If a second snapshot database is created, the version number is increased to 2.

Figure 2A:
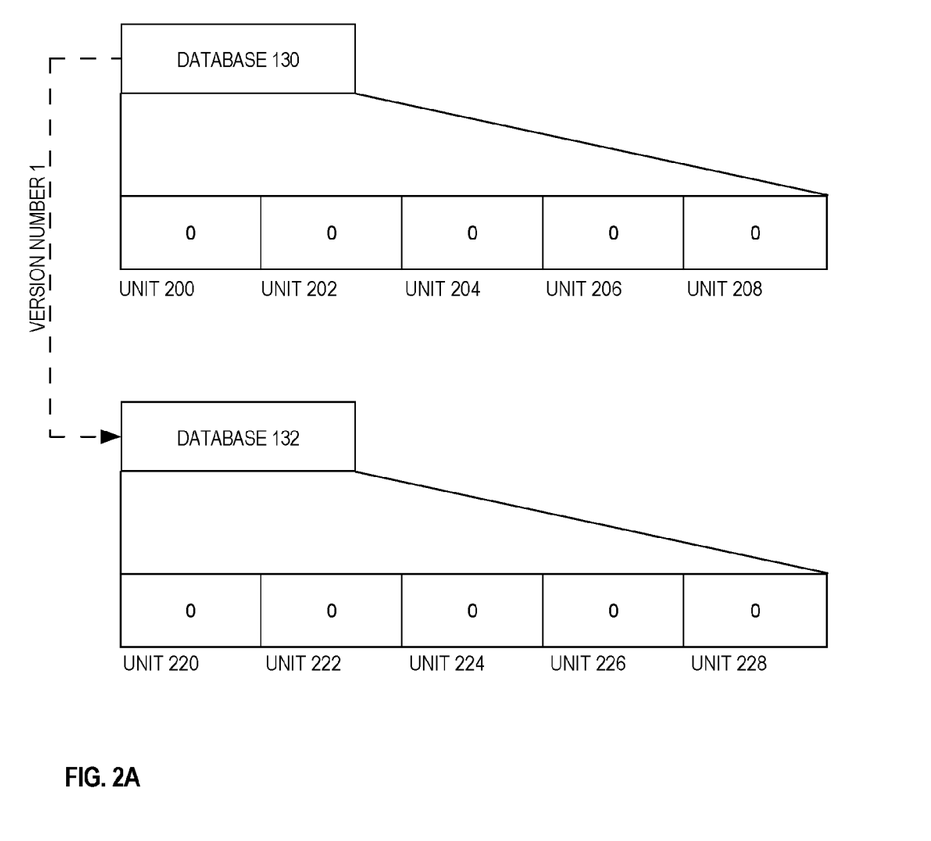
FIG. 2A is a block diagram illustrating a base database and a snapshot database.

In an embodiment, each data unit is associated with a version number. FIG. 2A illustrates data units of a base database and snapshot database. For the purpose of illustration, assume snapshot database 132 has just been created by copying base database 130. Base database 130 comprises data units 200, 202, 204, 206, and 208. Snapshot database 132 comprises data units 220, 222, 224, 226, and 228. Although the current version number is 1, the data units for base database 130 and snapshot database 132 are each associated with version number 0 because no data has been modified.

Figure 2B:
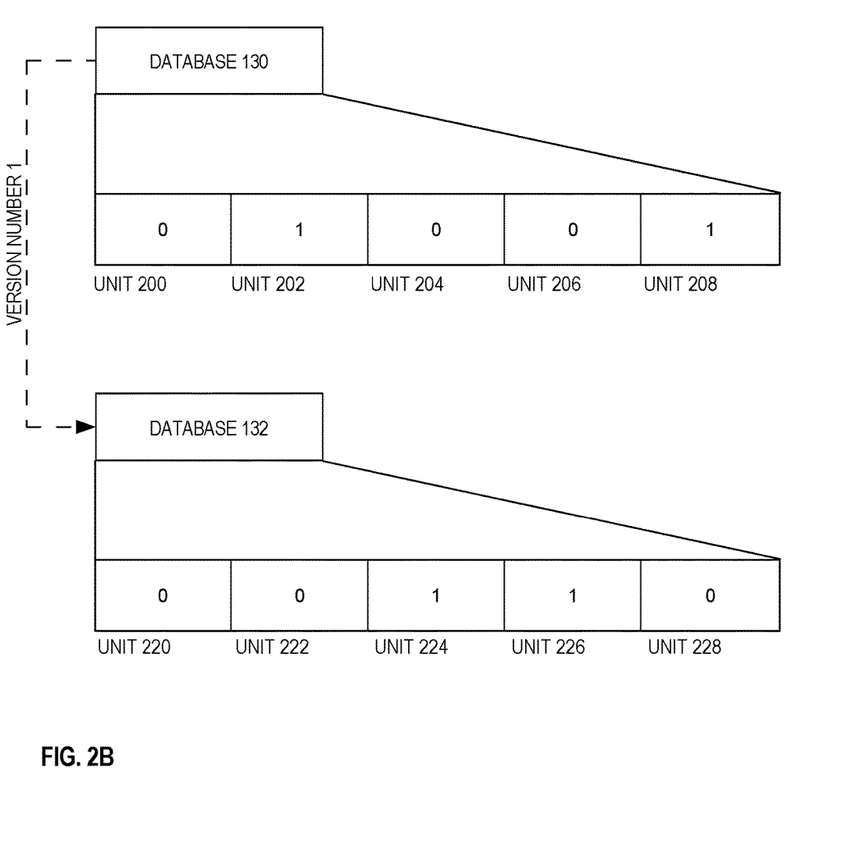
FIG. 2B is a block diagram illustrating a base database and a snapshot database with modified data.

When data in a database is modified, the data unit that was modified is associated with the current version number. FIG. 2B illustrates data units of a base database and a snapshot database after data in each database have been modified. Assume data units 202 and 208 of base database 130 and data units 224 and 226 of snapshot database 132 have been modified. Data units 202, 208, 224, and 226 are associated with version number 1, while data units 200, 204, 206, 220, 222, and 228 are associated with version number 0.

In an embodiment, data units are associated with a version number in a unit-to-version mapping. The unit-to-version mapping may be stored in a change tracking file or a data structure in persistent disk or persistent memory, such as in storage 120. Each database may have a respective unit-to-version mapping. In an embodiment, the unit-to-version mapping indicates a version number for each data unit of a database. In another embodiment, the unit-to-version mapping only indicates data units that have changed. For example, referring to FIG. 2B, the unit-to-version mapping may only indicate that data units 202, 208, 224, and 226 are associated with version number 1, and not include the data units that were unchanged.

In an embodiment, the unit-to-version mapping is only updated when the version number associated with a data unit is increased. For example, the first time data unit 202 is changed, the unit-to-version mapping is updated to indicate that data unit 202 is associated with version number 1. However, if data unit 202 is changed again while the version number is 1, then the unit-to-version mapping does not need to be updated. The unit-to-version mapping will continue to indicate that data unit 202 is associated with version number 1, regardless of how many times data unit 202 is modified. If the version number increases to 2, then the next time data unit 202 is modified, the unit-to-version mapping will update to indicate that data unit 202 is now associated with version number 2.

Figure 3A:
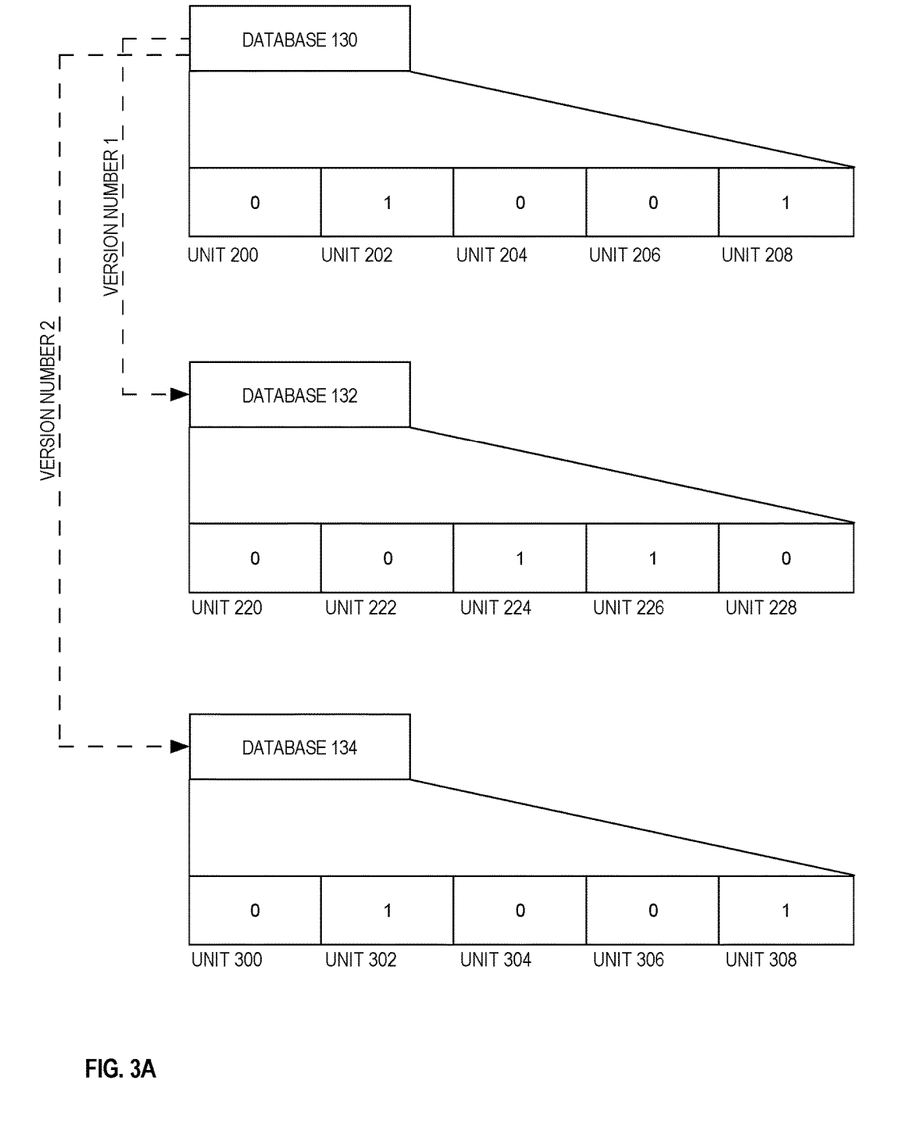
FIG. 3A is a block diagram illustrating a base database and two snapshot databases.

In an embodiment, the version number increases when a snapshot database is created or when snapshot databases are re-synced with the base database. FIG. 3A illustrates data units of a base database and two snapshot databases, after a third snapshot database is generated. For the purpose of illustration, assume snapshot database 134 is a copy of base database 130 after the data in base database 130 was modified as shown in FIG. 2B. Since another snapshot database was created, the version number is increased to 2. Snapshot database 134 contains the modified data from base database 130 while snapshot database 132 contains the changes previously shown in FIG. 2B. Data units 302 and 308 are associated with version number 1, like data units 202 and 208 in database 130.

If data is modified in either base database 130, snapshot database 132, or snapshot database 134, then the unit-to-version mapping will indicate that the modified data unit is associated with version number 2. Data units that were modified prior to the creation of snapshot database 134 will continue to be associated with version number 1, unless they are later modified. Data units that have not been modified will continue to be associated with version number 0.

Figure 3B:
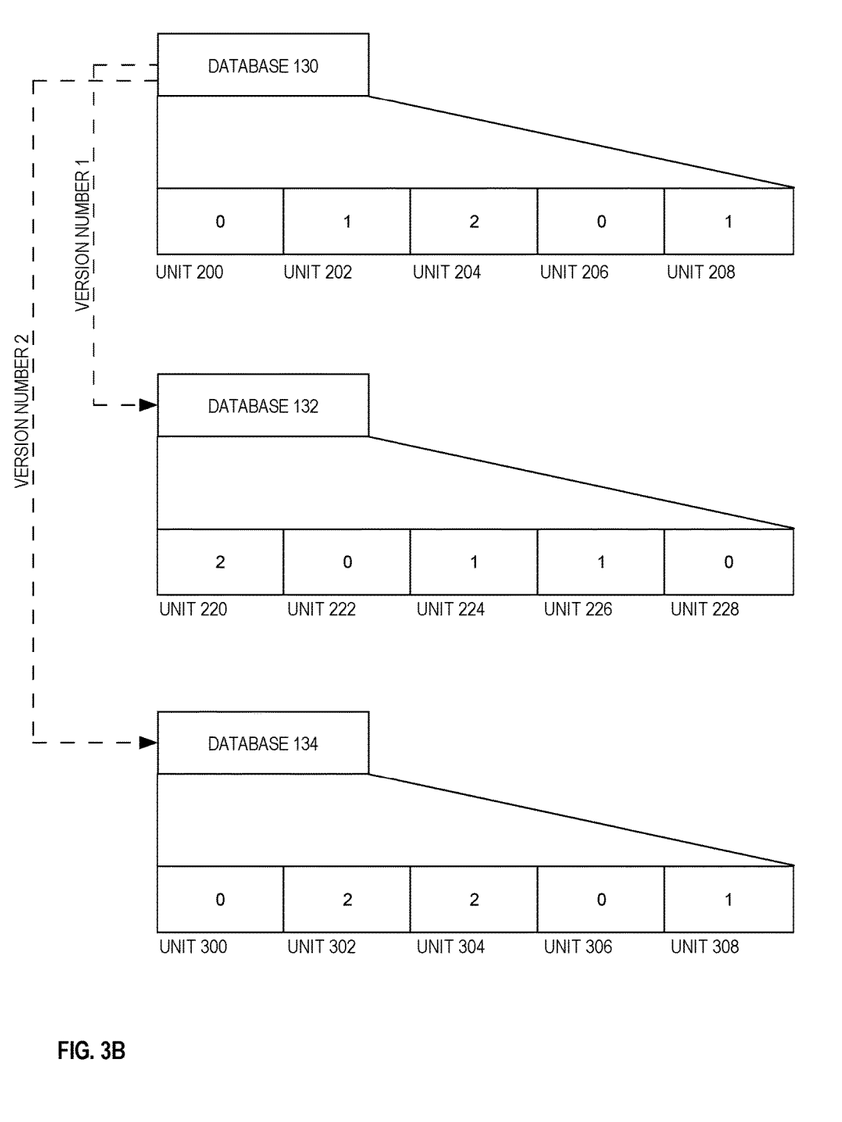
FIG. 3B is a block diagram illustrating a base database and two snapshot databases with modified data.

FIG. 3B illustrates data units of base database 130 and snapshot database 132 and 134 after data has been modified. Data units 204, 220, 302, and 304 have been modified. Each of data units 204, 220, 302, and 304 are associated with version number 2.

In an embodiment, each snapshot database is associated with the version number from when it was created. In the present example, snapshot database 132 is associated with version number 1 while snapshot database 134 is associated with version number 2.

In an embodiment, re-syncing one or more snapshot databases with a base database increases the version number. The one or more snapshot database are associated with the new version number as if they were a newly created snapshot database. For example, if snapshot database 132 and snapshot database 134 were re-synced, then the version number increases to version number 3 and snapshot databases are associated with version number 3. If only snapshot database 132 was re-synced, then snapshot database 132 would be associated with version number 3 while snapshot database 134 remains associated with version number 2.

In a clustered database system, multiple database instances may update or modify the same database at the same time. In an embodiment, each database instance stores a respective unit-to-version mapping. Each database instance can update its own unit-to-version mapping without waiting for a different database instance to finish updating the mapping. The database system indicates, to each database instance, the current version number. When the version number changes, the database system may indicate the updated version number to each database instance.

Database Re-Sync

When a snapshot database is re-synced with a base database, any changes that were made to the snapshot database are reverted while modified data in the base data are copied to the snapshot database. If a data unit in the base database was modified, then the data unit is copied to the snapshot database being re-synced. If a data unit in the snapshot database was modified, then the data unit is copied from the base database, regardless of whether that data unit was updated in the base database.

In an embodiment, the unit-to-version mapping is used to determine which data units in the snapshot database and the base database have changed. The database system checks the version number associated with a data unit in a snapshot database and a corresponding data unit in the base database. If a data unit has a version number equal to the current version number, then the data unit was modified. If either the data unit in the snapshot database or the corresponding data unit in the base database were modified, the data unit is copied from the base database to the snapshot database. The data unit in the snapshot database is overwritten with the data from the base database.

If both the data unit in the snapshot database and the corresponding data unit in the base database were unchanged, then that data unit does not need to be updated in the snapshot database. The only data units that need to be copied are data units that were modified in the base database and data units that were modified in the snapshot database.

Figure 4:
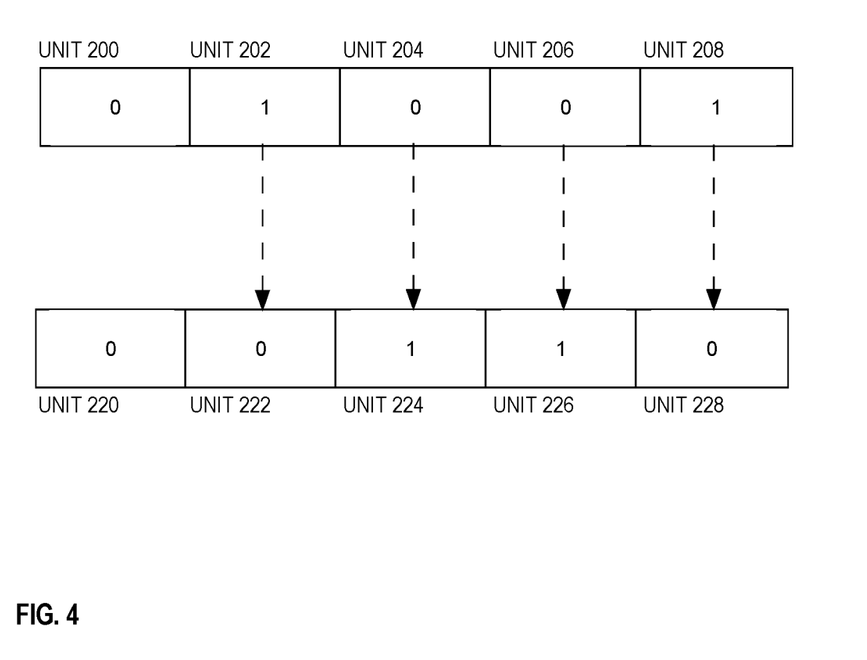
FIG. 4 is a block diagram illustrating a re-sync of a base database and a snapshot database.

FIG. 4 illustrates a re-sync of database 130 and database 132, as modified in FIG. 2B. Data units 202 and 208 of base database 130 and data units 224 and 226 of snapshot database 132 are associated with version number 1. Thus, to re-sync snapshot database 132 with base database 130, data units 202, 204, 206, and 208 are copied from base database 130 to snapshot database 132. Data unit 220 does not need to be copied, since neither data unit 220 nor corresponding data unit 200 were changed.

In an embodiment, each snapshot database is associated with a particular version number. When a snapshot database is re-synced with a base database, only the data units that are associated with a version number greater than or equal to the particular version number associated with the snapshot database need to be updated. For example, assume a first snapshot database is associated with version number 1 and a second snapshot database is associated with version number 2. If any data units in the first snapshot database are associated with version number 1 or greater, then the corresponding data unit needs to be copied from the base database. If any data units in the base database are associated with version number 1 or greater, then it is copied to the snapshot database.

However, only data units in the second snapshot database that are associated with version number 2 or greater need to be copied from the base database. Similarly, only data units in the base database that are associated with version number 2 or greater need to be copied to the second snapshot database. Data units associated with version number 1 or lower do not need to be copied.

Figure 5:
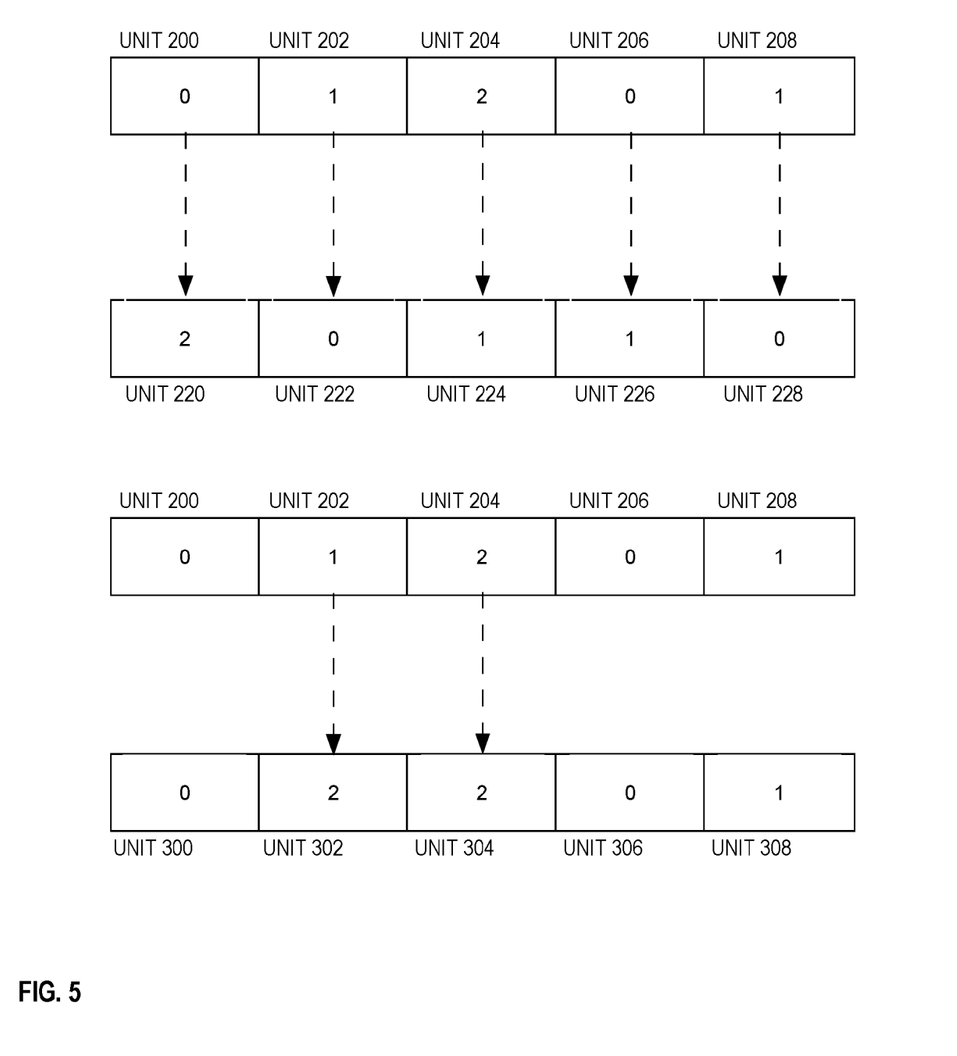
FIG. 5 is a block diagram illustrating a re-sync of a base database and two snapshot databases.

FIG. 5 illustrates a re-sync of database 130 with database 132 and database 134. Data units 202 and 208 of base database 130, data units 224 and 226 of snapshot database 132, and data unit 308 of snapshot database 134 are associated with version number 1. Data unit 204 of base database 130, data unit 220 of snapshot database 132, and data units 302 and 304 of snapshot database 134 are associated with version number 2.

Referring to FIG. 3B, snapshot database 132 is associated with version number 1. Any data units associated with version number 1 or higher need to be re-synced from base database 130 to snapshot database 132. Thus, data units 200, 202, 204, 206, and 208 are each copied to snapshot database 132.

Snapshot database 134 is associated with version number 2. Only data units associated with version number 2 or higher need to be re-synced from base database 130 to snapshot database 134. Thus, only data units 202 and 204 are copied to snapshot database 134.

DBMS Overview

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

A database block, also referred to as a data block, is a unit of persistent storage. A database block is used by a database server to store database records (e.g., to store rows of a table, to store column values of a column). When records are read from persistent storage, a database block containing the record is copied into a database block buffer in RAM memory of a database server. A database block usually contains multiple rows, and control and formatting information, (e.g., offsets to sequences of bytes representing rows or other data structures, list of transactions affecting a row). A database block may be referenced by a database block address (DBA).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computation resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance." A database server may comprise multiple database instances, some or all of which are running on separate computers or separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
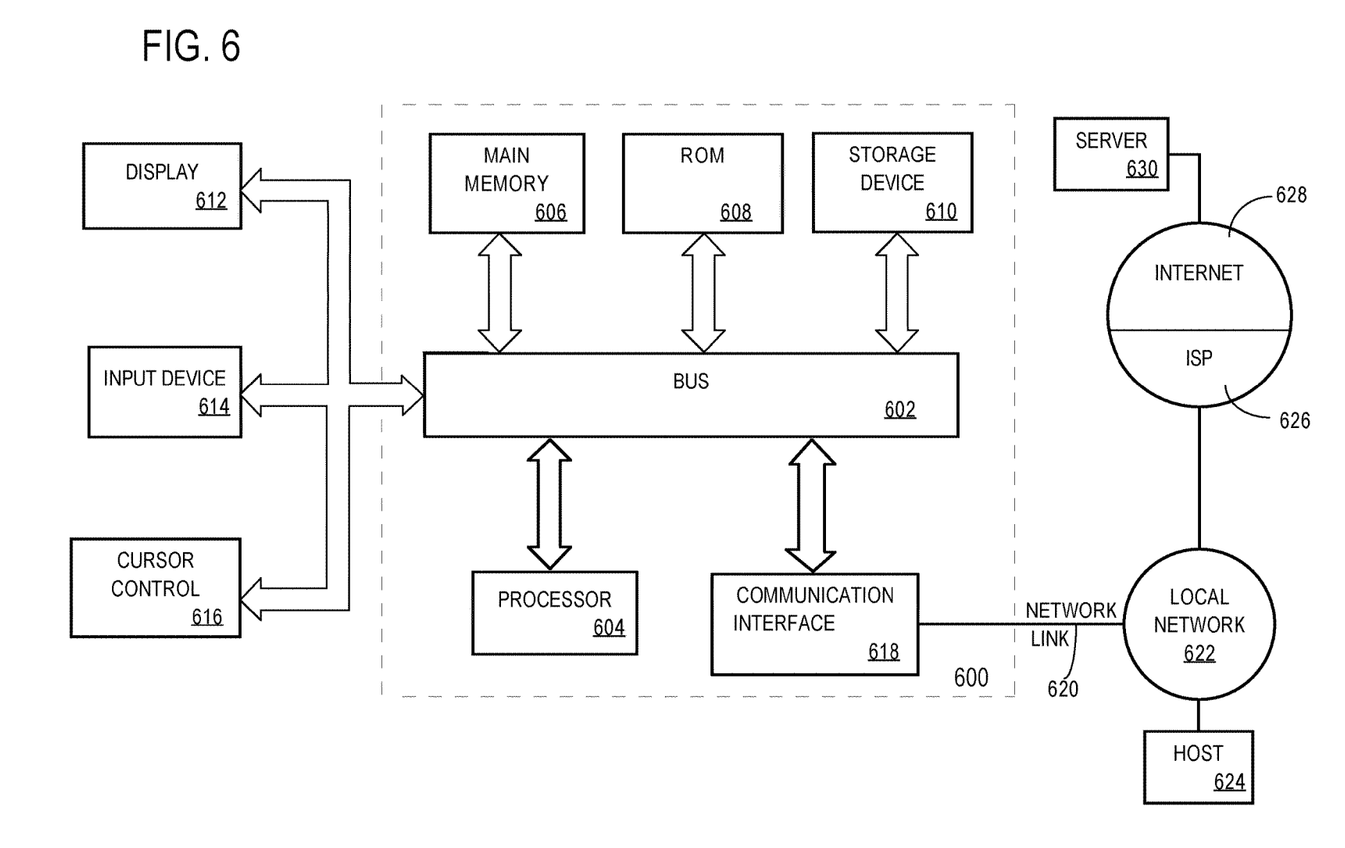
FIG. 6 is a block diagram illustrating a computer system that may be used to implement the techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, for a first database comprising a plurality of first data units, a mapping that associates the plurality of first data units with a base version number;
   creating a second database that is a copy of the first database;
   updating one or more data units of the plurality of first data units a first time;
   in response to updating the one or more data units the first time:
      determining a current version number is a second version number different from the base version number;
      determining that the mapping associates the one or more data units with the base version number, and in response, updating the mapping to associate the one or more data units with the current version number;
   updating the one or more data units a second time;
   in response to updating the one or more data units a second time:
      determining the current version number is the second version number;
      determining that the mapping associates the one or more data units with the second version number, and in response, not updating the mapping;
   syncing the second database with the first database, based on the mapping, by copying the one or more data units associated with the current version number to the second database.

2. The method of claim 1 further comprising:
   wherein the second database comprises a plurality of second data units corresponding to the plurality of first data units;
   storing a second mapping that associates the plurality of second data units with the base version number;
   updating one or more data units of the plurality of second data units;
   in response to updating the one or more data units, updating the mapping to associate the one or more data units with the current version number; and
   syncing the second database with the first database, based on the second mapping, by copying one or more data units of the plurality of first data units that correspond to the one or more data units associated with the current version number to the second database.

3. The method of claim 1 wherein updating the mapping to associate the one or more data units with the current version number further comprises:

for each data unit of the plurality of first data units, determining whether the data unit is associated with the current version number; and in response to determining the data unit is not associated with the current version number, updating the mapping to associate the data unit with the current version number.

4. The method of claim 1 further comprising increasing the current version number in response to syncing the second database with the first database.

5. The method of claim 1 further comprising increasing the current version number in response to creating a third database that is a copy of the first database.

6. The method of claim 1 wherein the second database is associated with a particular version number.

7. The method of claim 6 further comprising:
wherein each data unit of the plurality of first data units are associated with a respective version number; and
for each data unit of the plurality of first data units, copying the data unit to the second database if the respective version number is greater than or equal to the particular version number associated with the second database.

8. The method of claim 7 further comprising:
wherein the second database comprises a plurality of second data units corresponding to the plurality of first data units;
wherein each data unit of the plurality of second data units are associated with a respective version number; and
for each data unit of the plurality of second data units, copying a corresponding data unit from the first database if the respective version number is greater than or equal to the particular version number associated with the second database.

9. One or more non-transitory computer-readable media storing instructions which, when executed by one or more hardware processors, cause:
storing, for a first database comprising a plurality of first data units, a mapping that associates the plurality of first data units with a base version number;
creating a second database that is a copy of the first database;
updating one or more data units of the plurality of first data units a first time;
in response to updating one or more data the first time:
determining a current version number is a second version number different from the base version number;
determining that the mapping associates the one or more data units with the base version number, and in response, updating the mapping to associate the one or more data units with the current version number;
updating the one or more data units a second time;
in response to updating the one or more data units a second time:
determining the current version number is the second version number;
determining that the mapping associates the one or more data units with the second version number, and in response, not updating the mapping;
syncing the second database with the first database, based on the mapping, by copying the one or more data units associated with the current version number to the second database.

10. The one or more non-transitory computer-readable media of claim 9 wherein the instructions, when executed by the one or more hardware processors, further cause:
wherein the second database comprises a plurality of second data units corresponding to the plurality of first data units;
storing a second mapping that associates the plurality of second data units with the base version number;
updating one or more data units of the plurality of second data units;
in response to updating the one or more data units, updating the mapping to associate the one or more data units with the current version number; and
syncing the second database with the first database, based on the second mapping, by copying one or more data units of the plurality of first data units that correspond to the one or more data units associated with the current version number to the second database.

11. The one or more non-transitory computer-readable media of claim 9 wherein updating the mapping to associate the one or more data units with the current version number further comprises:
for each data unit of the plurality of first data units, determining whether the data unit is associated with the current version number; and
in response to determining the data unit is not associated with the current version number, updating the mapping to associate the data unit with the current version number.

12. The one or more non-transitory computer-readable media of claim 9 wherein the instructions, when executed by the one or more hardware processors, further cause increasing the current version number in response to syncing the second database with the first database.

13. The one or more non-transitory computer-readable media of claim 9 wherein the instructions, when executed by the one or more hardware processors, further cause increasing the current version number in response to creating a third database that is a copy of the first database.

14. The one or more non-transitory computer-readable media of claim 9 wherein the second database is associated with a particular version number.

15. The one or more non-transitory computer-readable media of claim 14 wherein the instructions, when executed by the one or more hardware processors, further cause:
wherein each data unit of the plurality of first data units are associated with a respective version number; and
for each data unit of the plurality of first data units, copying the data unit to the second database if the respective version number is greater than or equal to the particular version number associated with the second database.

16. The one or more non-transitory computer-readable media of claim 15 wherein the instructions, when executed by the one or more hardware processors, further cause:
wherein the second database comprises a plurality of second data units corresponding to the plurality of first data units;
wherein each data unit of the plurality of second data units are associated with a respective version number; and
for each data unit of the plurality of second data units, copying a corresponding data unit from the first database if the respective version number is greater than or equal to the particular version number associated with the second database.

* * * * *